March 5, 1968 C. E. BARNES ETAL 3,371,580
MULTIPLE AXIS MILLING MACHINE AND FIXTURE
Filed Jan. 21, 1966 3 Sheets-Sheet 1

INVENTORS
CLAIR E. BARNES
CLINT T. HAYS
BY RICHARD A. MYERS

Edwin Coates
— ATTORNEY

March 5, 1968   C. E. BARNES ETAL   3,371,580
MULTIPLE AXIS MILLING MACHINE AND FIXTURE
Filed Jan. 21, 1966   3 Sheets-Sheet 3

INVENTORS
CLAIR E. BARNES
CLINT T. HAYS
RICHARD A. MYERS
BY Edwin Coates
ATTORNEY

United States Patent Office 3,371,580
Patented Mar. 5, 1968

3,371,580
MULTIPLE AXIS MILLING MACHINE
AND FIXTURE
Clair E. Barnes and Clint T. Hays, Long Beach, and Richard A. Myers, Rolling Hills, Calif., assignors, by mesne assignments, to McDonnell Douglas Corporation, Santa Monica, Calif., a corporation of Maryland
Filed Jan. 21, 1966, Ser. No. 522,079
10 Claims. (Cl. 90—11)

This invention lies in the field of multiple axis milling machines and is directed particularly to apparatus for greatly increasing the productive capacity of a multiple axis machine of the type presently used in industry without a corresponding increase in complexity, cost, or floor space requirements.

The present day multiple axis milling machine is used for producing simple and complex three dimensional contours in blanks or partially formed work pieces and is particularly suited for forming small quantites of parts which could be formed by high production methods, such as forging or stamping, but only at a much higher unit cost because of the high total cost of the tooling required. It is also very valuable for forming parts whose contours are too complicated for the high production methods.

The machine referred to utilizes a single spindle, which term may be considered as applying to the cutter shaft with a milling cutter formation on its outer free end or the assembly of such cutter with a motor driven shaft by way of a collet or chuck. The spindle is, of course, rotatable about its own axis for removal of metal or other material from a work piece by the action of the cutter formation. In addition to the axis of rotation for cutting, it has five other axes of movement. It is mounted for rectilinear bodily displacement vertically and horizontally in a vertical plane parallel to the general plane of the work piece and horizontaly normal to said plane toward and away from the work piece. In addition it is mounted for angular swinging in horizontal and vertical planes so that the axis of the spindle may be set at any angle with respect to the plane of the work piece.

It will be seen that with these five axes of movement the spindle carried by the machine may be manipulated in every desired direction as completely as a hand-held tool. It is common practice to control a machine of this type by a multi-channel numerical control tape so that the entire operation of forming a part from a work piece may be programmed in advance, and every part turned out by the machine will be identical in every respect.

The work piece is normally held in a fixture which includes a generally upright frame carrying a work holding table which has a front face lying in a vertical plane parallel to the plane of the first two axes of bodily movement of the spindle mentioned above. The table is stationary and the work piece is rigidly mounted thereon, and all of the movement is incorporated in the spindle mounting.

The machine described above performs its work efficiently and with reasonable rapidity. However, it is limited to the production of one part at a time. If it is desired to produce two or more parts at the same time, it is necessary to provide an equivalent number of machines and holding fixtures. Since they are very expensive they add greatly to the fixed cost, and they also use a great deal of additional expensive floor space.

It has been proposed to mount a plurality of work pieces on a fixture in vertically spaced relation and to mount a corresponding number of spindles on a vertically elongate spindle head with the spindles in fixed relation to each other with the same vertical spacing as the work pieces, and to mount the spindle head for five axis movement. However, this arrangement cannot be used because when the spindle head tilts in a vertical plane the spindles above and below the tilt axis will move in opposite directions toward and away from their respective work pieces and thus cannot perform identical cutting operations.

The difficulties described above are overcome by the novel apparatus incorporating the present invention. The milling machine is modified to provide a plurality of spindles mounted in vertically spaced relation on a supporting base with each spindle being bodily movable along the three axes of translation and being swingable or tiltable in a horizontal plane. The spindles may be completely independently mounted but it has been found most practical to mount them in fixed relation to each other in a vertically elongate spindle head, the latter then providing the four axes of movement just described. The base itself may be stationary or it may provide one or more of the four movements.

The fixture, in its presently preferred form, includes a stationary frame which is vertically and horizontally extensive in a vertical plane. A plurality of work holding tables are mounted on the frame in vertically spaced relation and in positions confronting the milling machine. Each table is horizontally elongate and is mounted to the frame on a horizontal axis with the axes of rotation of all of the tables lying in a vertical plane parallel to the general plane of the frame. The front faces of the tables are preferably planar and, when the tables are in neutral position, all of these front faces lie in a common vertical reference plane. The vertical center distances between their axes of rotation are exactly the same as the vertical center distances between the axes of the spindles. Therefore, when a work piece is mounted on each table they will all bear the same relation to their respective spindles.

The pivotal mountings for the tables are located behind their front faces, thus leaving them clear so that occasional work pieces which are horizontally longer than the tables may be mounted securely without interference by the mounting structure. A pair of gear segments are secured to the back of each table and extend rearwardly therefrom, one segment of each pair being in vertical alignment with a corresponding segment on each of the other tables. A vertically elongate, vertically extending rack engages the teeth of all segments in one vertically aligned group, and a similar rack engages the other group. A pair of drive gears on a horizontal drive shaft reciprocate the racks vertically in unison in response to control signals.

Since all of the gear segments are driven in unison, all of the tables likewise tilt vertically in unison to exactly the same angular extent. Consequently the work pieces all bear the same vertical angular relation to their respective cutter spindles at all times, thus providing the complementary fifth axis of movement. From this it will be seen that the apparatus incorporating the invention makes it possible to machine a plurality of work pieces at one time with complete five axis movement, while occupying substantially the same floor space required by a conventional machine which is capable of machining only a single work piece. Moreover, the addition structure required is very minor in terms of complexity or cost of duplicate conventional machines.

Various other advantages and features of novelty will become apparent as the description proceeds in conjunction with the accompanying drawings, in which.

The apparatus incorporating the invention is actually a very complex numerically controlled machine, most of the details of which are well known to those skilled in this art. For ease of understanding and clarity of illustration it is shown in highly simplified form in FIG. 1 as comprising two basic components, the multiple position work holding fixture 10 and the multiple axis milling machine 12.

Figure 4:
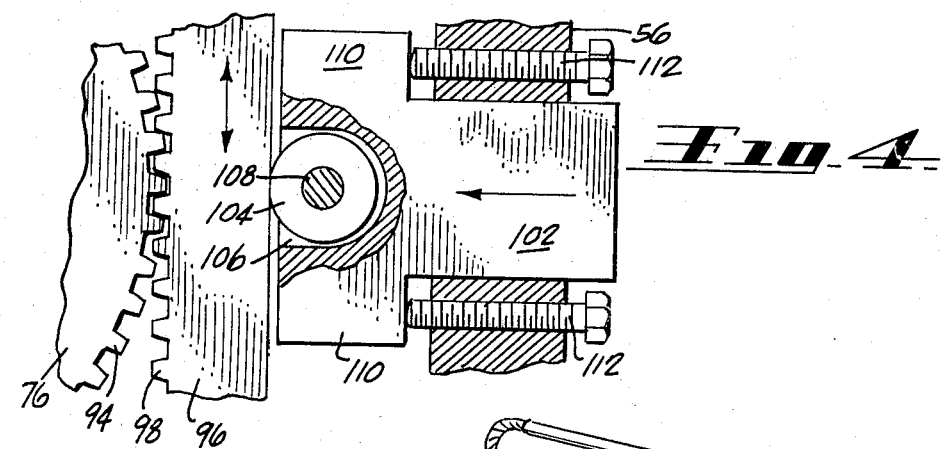
FIG. 4 is a side elevational view, partly in section, of a detail of the table drive mechanism.
Figure 2:
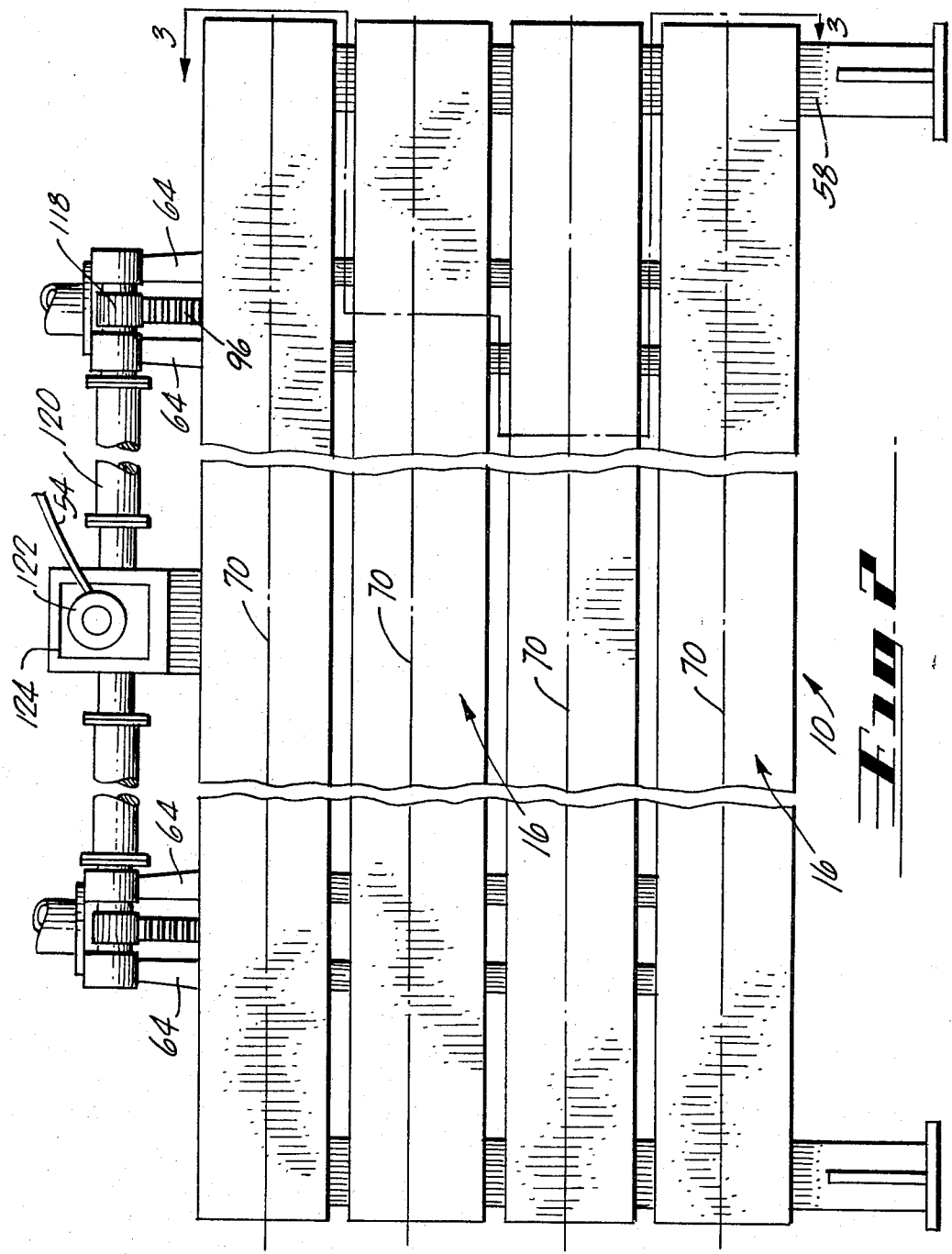
FIG. 2 is a front elevational view of the work holding fixture.
Figure 3:
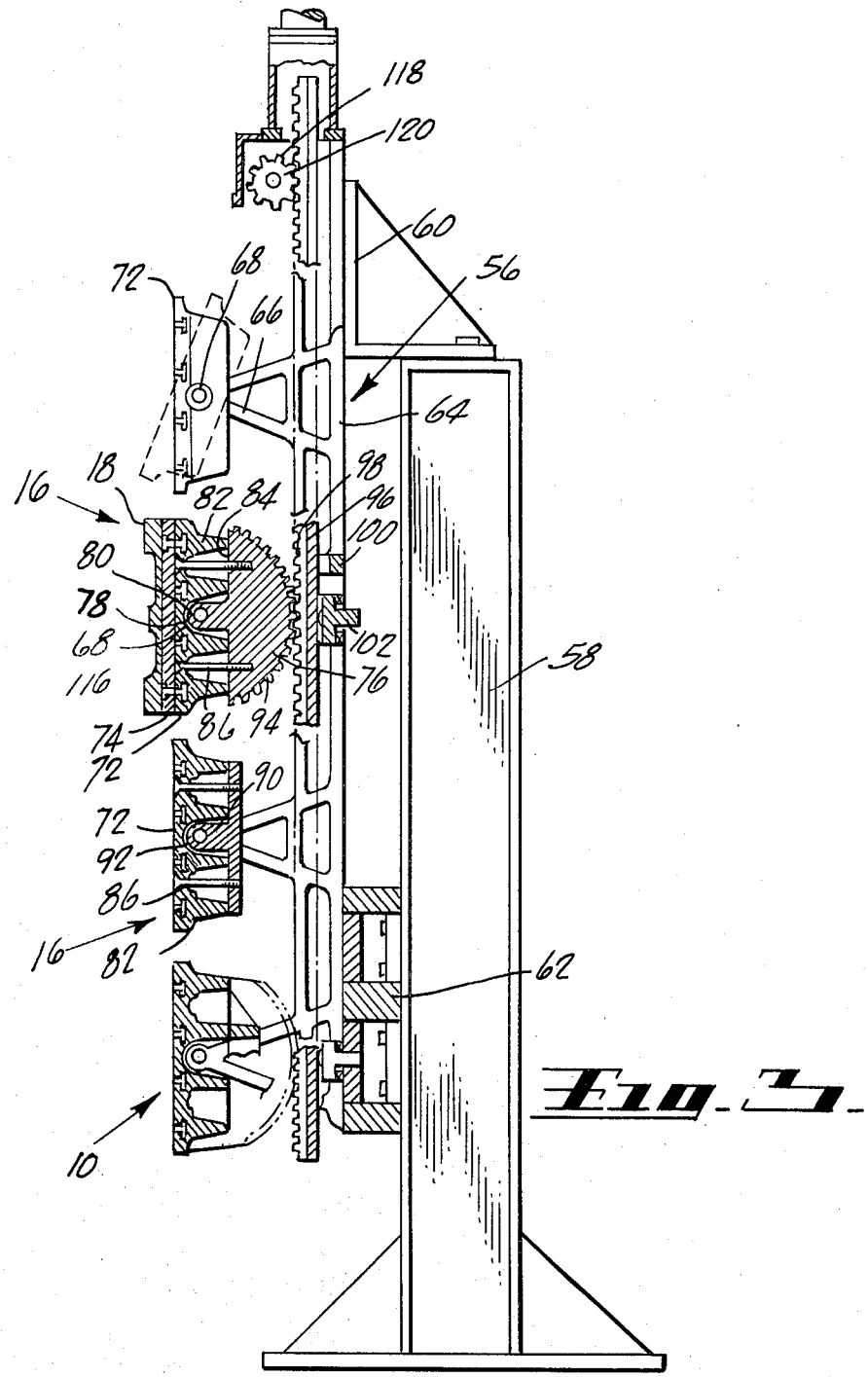
FIG. 3 is a side elevational view, partly in section taken along line 3—3, of the fixture of FIG. 2.

The fixture 10 includes a structural frame 14 carrying a plurality of vertically spaced, horizontally elongate work holding tables 16, each of which is adapted to have firmly secured thereto a work piece 18. Each table is mounted to the frame for rotation about a horizontal axis parallel to the longitudinal axis of the table for vertical tilting upward and downward from a neutral position in which the front faces of the tables, preferably entirely planar, all lie in a common vertical reference plane. The angular movement or vertical tilt, is preferably slightly in excess of 45 degrees in each direction from the neutral position. The pivotal mountings for the tables and the mechanism for operating them, which are enclosed by housing 20, are illustrated in FIGS. 2, 3, and 4, and will be described in detail subsequently.

The milling machine 12, which is shown in minimum detail for illustrative purposes only, includes a supporting column or base 22 mounted on floor 24 for horizontal rectilinear movement along a line parallel to the reference plane of tables 16. For this purpose it is provided with guide members moving in guide slots 26 to control its movement. The base is provided with vertically extending flanges 28 to guide the vertical movement of arm 30 which is provided with cooperating guide flanges 32. Drive means for the base and the arm are located within the base.

Sleeve 34 fits over arm 30 in telescoping sliding engagement for horizontal rectilinear movement toward and away from fixture 10 in a direction normal to the reference plane of tables 16 and is controlled by drive means within the hollow assembly of members 30 and 34. The latter is provided with upper and lower horizontally extending flanges 36 constituting a yoke in which spindle head 38 is mounted by pivot pins 40 for horizontal tilt, or rotation about a vertical axis. A plurality of spindles 42 equal in number to the tables 16, in this case four, extend from the front face of the spindle head 38. The term "spindle" may apply to the assembly of shanks 44 and chucks 46 together with rotating drive shafts not shown, or simply to shanks 44 having milling cutter formations 48 at their outer free ends. The drives for the spindle head and the spindles are contained within spindle head 38.

Spindles 42 are, of course, mounted for rotation about their own axes in head 38 for the purpose of removing material from work pieces 18 but they are fixed in relation to each other. In the preferred form they are in vertical alignment and their vertical center distances are exactly the same as the vertical center distances between the axes of rotation of tables 16. Therefore, each spindle confronts its respective work piece at the same point.

It will now be seen that, with the construction described, the spindles 42 are provided with the three rectilinear axes of movement of a conventional machine and also with the horizontal tilt but that they are restrained against vertical tilt. They move in unison in these four senses and in exacly the same way with respect to their respective work pieces. At the same time the tables 16 are controlled in unison for vertical tilt so that the work pieces all confront their respective spindles at exactly the same vertical angles at all times. In the exemplary construction base 22 moves horizontally along guide slots 26. It will be apparent that the base may be stationary, with all four movements occurring with respect to it, or more than one of the movements may be incorporated in the base. The construction shown is chosen primarily to illustrate the operation in simple fashion.

Cable 50 supplies all of the power needed for the various operations, and control panel 52 provides complete control. Conductor means 54 transmits power to fixture 10 for actuation of the work holding tables. When the machine is tape controlled, the tape reader and signal transmitting means are housed within base 22, and the signal from the vertical tilt channel of the tape is also transmitted through conductor means 54.

The general construction and arrangement of parts of the fixture are illustrated in FIGS. 2 and 3 where skeleton frame 56 is shown attached to structural columns 58 by means of upper brackets 60 and lower brackets 62 by welding, threaded fasteners, or other conventional means. The skeleton frame is quite extensive vertically and horizontally, and its elongate elements 64 define a generally vertical plane. Triangular brackets 66 extend forwardly from the plane of the frame and are provided at their forward free ends with pivot bearings, not shown, having horizontal axes parallel to the plane of the frame in which are journaled pivot pins 68.

Work holding tables 16 are shown schematically in FIG. 2 as being horizontally elongate with their longitudinal axes 70 extending horizontally and the tables spaced vertically one above the other. As seen in FIG. 3, the tables are normally made up of a base plate 72 having conventional T-slots for hold-down purposes and a face plate 74 secured to the base plate and having a multiplicity of threaded holes therein to receive bolts for securing a work piece to the face plate. With this arrangement, some work pieces can be accurately located on a second set of face plates while other work pieces mounted on a first set of face plates are being machined. By virtue of the T-slots, new work pieces can be quickly exchanged for completed ones and accurately located on the fixture.

The tables 16, and more specifically base plates 72, are indirectly mounted on brackets 66 for vertical tilt or rotation. For each table there is provided a pair or set of gear segments 76. These gear segments are spaced about a quarter of the total length of the table from each end and lie with their major planes in vertical planes normal to the plane of frame 56. Each gear segment has a forwardly extending tongue 78 having a horizontally extending aperture 80 journaled on pivot pin 68 to form an axis of rotation for the gear segment. Base plate 72 has rearwardly extending ribs 82 engaging the forward edge 84 of each gear segment and is held securely in the position shown by any suitable means such as bolts 86. Consequently pivot pins 68 define the axis of rotation of the base plate or table.

Additional support for each base plate is provided at intermediate points along the axis of rotation by a plurality of support plates 88 having tongues 90 provided with apertures 92 journaled on pivot pins 68. They are secured to the base plate as shown by additional bolts 86.

Each gear segment has an arcuate rear periphery centered on the axis of its respective pivot pin 68 and is provided with a set of teeth 94 for engagement by a driving rack. The gear segments for all tables are vertically aligned in two parallel rows so that in the illustrative example there are four gear segments in each vertical row with all of their planes lying in a common vertical plane and with their peripheries all tangent to a common vertical line.

A vertically elongate, vertically movable driving rack 96 is provided for each vertical row of gear segments and is formed with a set of teeth 98 matching teeth 94 to insure driving engagement without backlash. A plurality of guide yokes 100 embrace the sides of each rack to restrain it against lateral movement and a pressure applying member urges the rack into positive zero clearance engagement with each gear segment. It applies pressure to the rack in a direction perpendicular to the axis of the rack and passing horizontally through the point of tangency of the rack and the gear segment and radially through the axis of rotation of the gear segment.

As best seen in FIG. 4, the pressure applying member constitutes a block 102 slidably carried in frame 56 for horizontal movement and one or more rollers 104 mounted in cavity 106 for rotation about pivot pin 108. The block is provided with vertically extending ears 110 which are engaged by bolts 112 threadedly carried by the frame. As can be seen, the roller contacts the rear face of rack 96 at the junction of a horizontal line passing through the point of tangency of the rack and gear segment and radially through the axis of the gear segment. After assembly, the bolts 112 are advanced until the roller 104 firmly forces the rack into zero clearance engagement with the gear segment.

As shown in FIG. 3, when the tables 16 are in neutral position all of their front faces lie in a common vertical reference plane which is parallel to the plane containing their axes of rotation and also the general vertical plane of frame 56. If the base plates are used alone, then their front faces 114 define the reference plane. If the face plates 74 are also used, as is the usual case, then their front faces 116 define the reference plane. Since the racks are in engagement with all of the gear segments, the four tables are constrained to tilt vertically upward or downward to exactly the same angular extent at all times, and therefore the work pieces carried by the tables will always be at exactly the same vertical angular attitude to their respective spindles.

It will be seen that the structure forming the pivotal connections between the tables and the frame lies entirely behind the reference plane defined by the front faces of the tables. Consequently there is no physical protuberance beyond the front faces at any point including the ends. Therefore, if an occasional work piece is longer than the total length of a table it can be properly secured thereto in the same way as a shorter piece. Because of this feature it is possible to make the tables just long enough to accommodate the majority of the work pieces, reducing the size and cost of the fixture and the amount of floor space required. In the construction shown, the axis of rotation of the tables is behind the reference plane. If it is desired to locate the axis of rotation forward of the reference plane, the tables may be mounted by means of arcuate tracks so that a virtual pivot axis is forward of the reference plane while all of the supporting structure is rearward of it, thereby still allowing the mounting of extra long work pieces.

The racks 96 are driven in unison by a pair of pinion gears 118 mounted on the upper portion of frame 56. The gears 118 are fixed to an elongate drive shaft 120 which extends horizontally along the upper portion of frame 56 and generally in its vertical plane. Shaft 120 is driven by motor 122 acting through gear box 124. Both the motive power and the control signals for the motor are transmitted through conductor means 54. Thus the action of the single motor and drive shaft causes all of the work holding tables 16 to tilt vertically to exactly the same extent at all times to provide the complementary fifth axis of movement for the combination of the milling machine and fixture.

Figure 1:
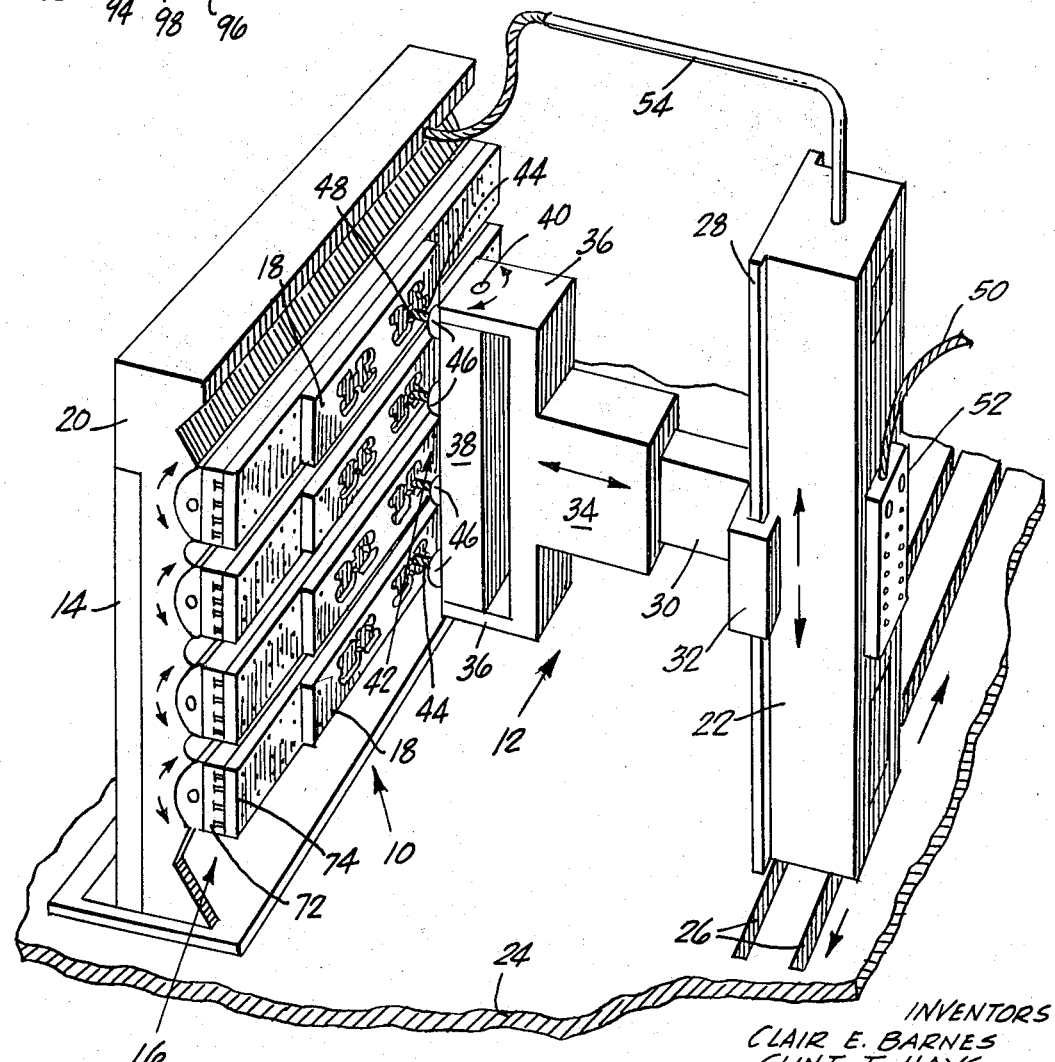
FIG. 1 is a perspective view of the complete apparatus incorporating the invention.

While the spindles 42 are all fixedly mounted in spindle head 38 in the form shown in FIG. 1, it will be apparent that the spindles can be individually movably mounted in a fixed support for movement on the same four axes so long as their movements are always synchronized. The relative arrangement and movement of the parts and their orientation in space as illustrated has been found to be highly satisfactory. However, the orientation may be changed to provide vertically extending tables, or tables in a horizontal reference plane with the milling machine above, so long as the relation and cooperation of the parts remain the same. The description has been couched in terms of the orientation shown solely for simplicity and clarity of understanding.

It will be apparent to those skilled in the art that these and various other changes may be made in the apparatus as disclosed without departing from the spirit of the invention, and it is intended that all such changes shall be embraced within the scope of the following claims.

We claim:

1. The combination of a multiple spindle milling machine having multiple axes of movement and a multiple position work holding fixture having a single complementary axis of movement; said fixture including a supporting frame mounted in a fixed position and a plurality of work holding tables carried by said frame; each table being horizontally elongate and pivotally mounted on said frame for rotation about a horizontal axis; said tables being mounted one above the other in vertically spaced relation with their axes of rotation in a common vertical plane and having work receiving front faces lying in a common vertical reference plane when said tables are in neutral position to receive substantially identical work pieces; a gear segment secured to the rear face of each table and lying in a vertical plane normal to said reference plane; a vertically extending elongate rack vertically movably carried by said frame and drivingly engaging each of said gear segments to simultaneously tilt said tables angularly upward and downward to the same extent about their horizontal axes of rotation; said milling machine confronting said fixture and including a supporting base and a plurality of milling cutter spindles equal in number to the work holding tables mounted on said base for movement as a unit; said spindles being vertically spaced one above the other with the center distances between them being exactly equal to the center distances between the axes of rotation of the tables; said spindles being fixed against angular movement in a vertical plane and, in neutral position, each extending horizontally normal to said reference plane; said spindles being movable as a unit rectilinearly vertically and horizontally parallel to said reference plane and horizontally toward and away from said reference plane, and angularly horizontally; the individual but simultaneous vertical angular tilting of the tables providing the identical vertical angular relation between each cutter spindle and its respective workpiece while maintaining the identical horizontal distance between each spindle and the reference plane.

2. The combination as claimed in claim 1; the pivotal support means for said work holding tables being located behind the front faces of the tables to facilitate mounting of work pieces horizontally longer than the work holding tables.

3. The combination as claimed in claim 1; said base being movable along a horizontal line parallel to said reference plane; a spindle head mounted on said base for rectilinear movement vertically parallel to said reference plane and horizontally toward and away from said reference plane, and for horizontal angular movement; and said spindles being mounted in said spindle head in fixed relation to each other.

4. The combination of a multiple spindle milling machine having multiple axes of movement and a multiple position work holding fixture having a single complementary axis of movement; said fixture including a supporting frame mounted in a fixed position and a plurality of work holding tables carried by said frame; each table being horizontally elongate and pivotally mounted on said frame for rotation about a horizontal axis; said tables being mounted one above the other in vertically spaced relation with their axes of rotation in a common vertical plane and having work receiving front faces lying in a common vertical reference plane when said tables are in neutral position to receive substantially identical work pieces; means to tilt said tables in unison about their axes of rotation to exactly the same angular extent for cooperation with a set of identical milling cutters having spindles extending in vertically spaced horizontal planes; the structure connecting said tables to said frame for rotation lying entirely behind said reference plane to facilitate mounting of work pieces horizontally longer than the work holding tables; said milling machine confronting said fixture and including a supporting base and a plurality of milling cutter spindles equal in number to the work holding tables movably mounted on said base and having cutter formations at their outer free ends; said spindles extending in horizontal planes vertically spaced one above the other with the vertical center distances between them being exactly equal to the vertical center distances between the axes of rotation of the tables; said spindles being so mounted as to be restrained against angular movement in a vertical direction and, in neutral position, each extending horizontally normal to said reference plane; said spindles further being mounted so as to be constrained to move as a unit rectilinearly vertically and horizontally parallel to said reference plane and horizontally toward and away from said reference plane, and angularly horizontally; the available horizontal movement parallel to the reference plane being greater than the lengths of the tables; the individual but simultaneous vertical angular tilting of the tables providing the identical vertical angular relation between each cutter spindle and its respective work piece while maintaining the identical horizontal distance between each spindle and the reference plane; and the combination of the vertical angular tilting of the work holding tables and the horizontal angular swinging of the spindles providing a universal range of angular relations between said spindles and the work pieces.

5. A multiple position work holding fixture for cooperative use with a multiple spindle milling machine having multiple axes of movement, comprising: an upright frame generally defining a vertical plane; support brackets on said frame extending forwardly of its plane; a plurality of horizontally elongate work holding tables pivotally mounted on said brackets for rotation about horizontal axes; said tables being vertically spaced from each other with their axes of rotation all lying in a common vertical plane and having front faces for the reception of substantially identical work pieces; said tables having a neutral position in which said front faces lie in a common vertical reference plane; and means to tilt said tables out of said reference plane in unison about their axes of rotation to exactly the same angular extent for cooperation with a set of identical milling cutters; said means comprising at least one gear segment secured to each table and lying in a common vertical plane normal to said reference plane; a vertically extending rack vertically movably carried by said frame and having teeth in driving engagement with each of said gear segments; and drive means to reciprocate said rack vertically to rotate each of said gear segments and their associated tables through identical vertical angles.

6. A fixture as claimed in claim 5; the pivotal connections between said tables and said brackets being behind said reference plane to facilitate mounting of work pieces horizontally longer than the work tables.

7. A fixture as claimed in claim 5; and a pressure applying member carried by said frame for each gear segment; said member being mounted and located to apply pressure to said rack in a direction perpendicular to the axis of said rack and passing through the point of tangency of the rack and gear segment and radially through the axis of rotation of the gear segment.

8. A fixture as claimed in claim 7; each of said pressure applying members constituting a block slidably carried by said frame for horizontal movement toward and away from said rack; roller means carried by said block in horizontal alignment with the axis of rotation of its respective gear segment and in pressure applying engagement with said rack; and adjustable means to move said block and roller means toward said rack to maintain zero clearance between the teeth of said gear segment and rack.

9. A multiple position work holding fixture for cooperative use with a multiple spindle milling machine having multiple axes of movement, comprising: an upright frame generally defining a vertical plane; support brackets on said frame extending forwardly of its plane; a plurality of sets of gear segments pivotally mounted on said brackets; each set comprising at least two gear segments horizontally spaced longitudinally of said frame and having a common horizontal axis of rotation parallel to the plane of said frame with their arcuate, toothed portions extending rearwardly toward the plane of said frame; said sets being vertically spaced one above the other with all of their axes of rotation in a common vertical plane; a horizontally elongate work holding table being secured to the forward portions of each set of gear segments; all of said work tables having a neutral position in which their front faces lie in a common vertical reference plane; a vertically extending, vertically movable rack carried by said frame for each plurality of vertically aligned gear segments and having teeth in driving engagement with the teeth of said gear segments; and drive means for simultaneously raising and lowering said racks to cause all of said gear segments and tables to tilt simultaneously to the same angular extent.

10. A fixture as claimed in claim 9; said drive means comprising a drive shaft rotatably mounted on said frame and extending horizontally above said gear segments and tables parallel to the plane of said frame; a drive gear for each rack fixedly mounted on said drive shaft for rotation therewith and engaging the teeth on the upper portions of said racks; and motor means to actuate said drive shaft.

References Cited
UNITED STATES PATENTS 828,473   8/1906   Grüneberg _____ 90—58 XR FRANCIS S. HUSAR, *Primary Examiner.*